Figure 10:
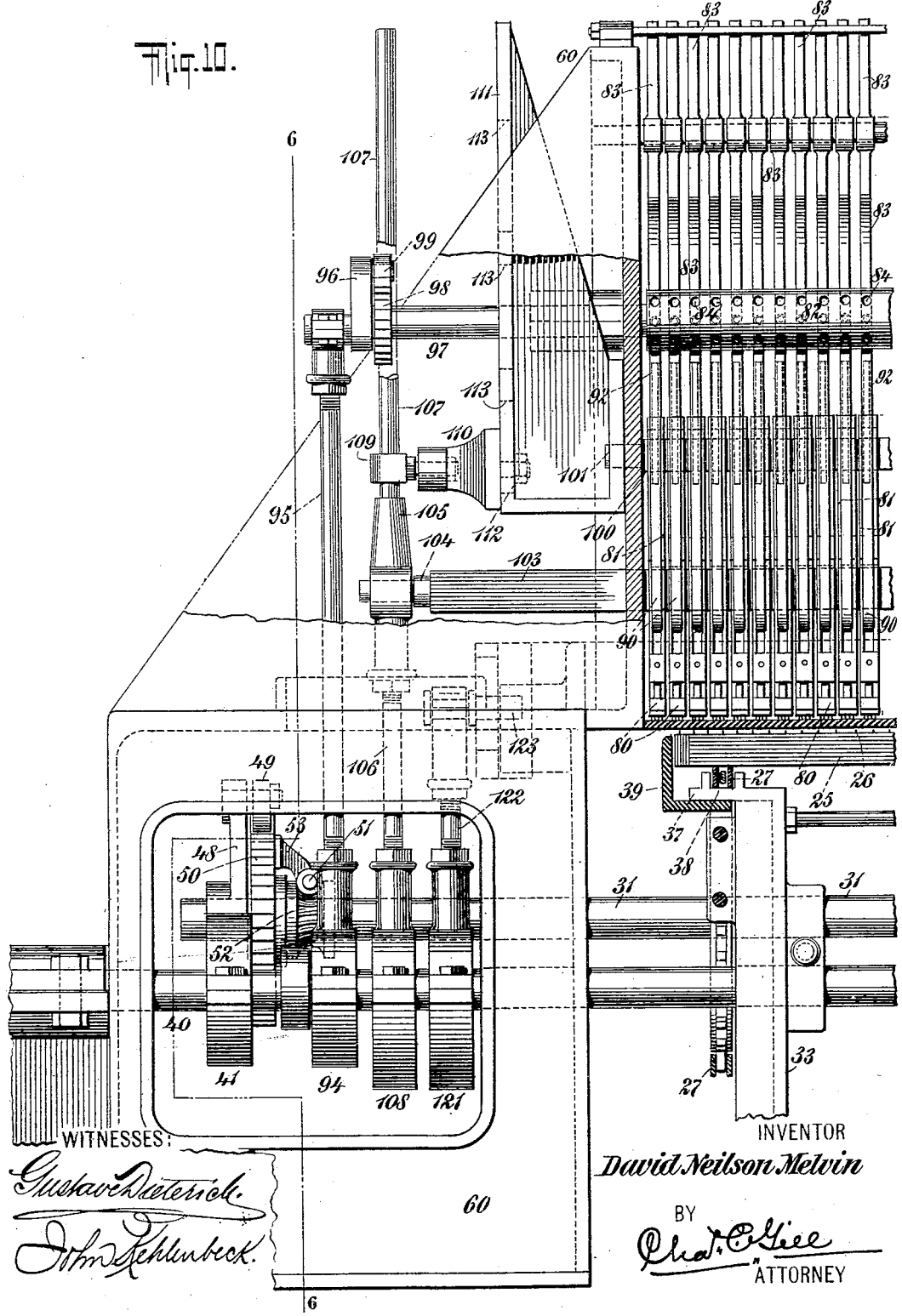

No. 704,068. Patented July 8, 1902.
D. N. MELVIN.
MACHINE FOR THE MANUFACTURE OF INLAID LINOLEUM.
(Application filed Oct. 23, 1901.)
(No Model.) 9 Sheets—Sheet 1.
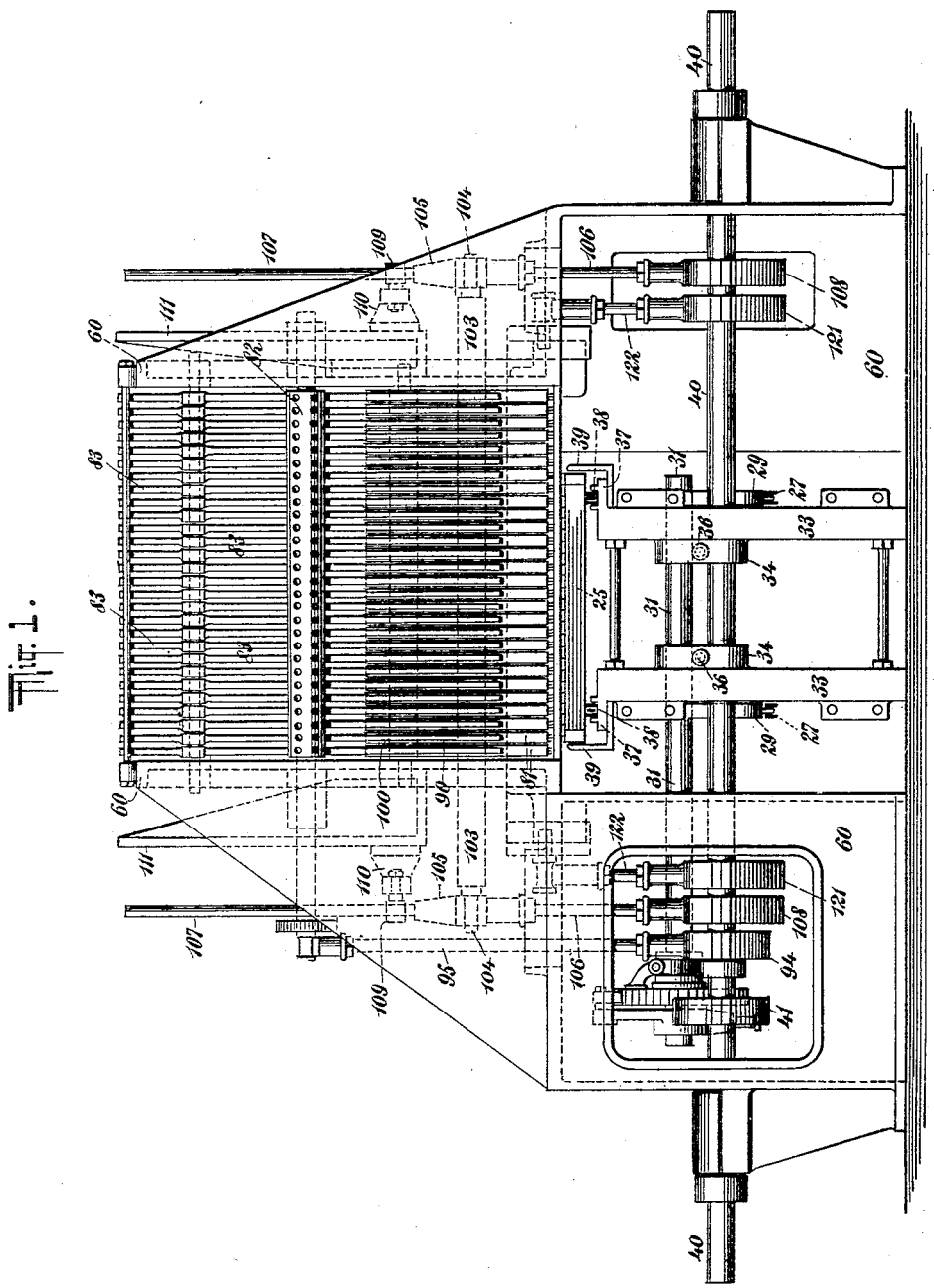
WITNESSES:
INVENTOR
David Neilson Melvin
BY
ATTORNEY

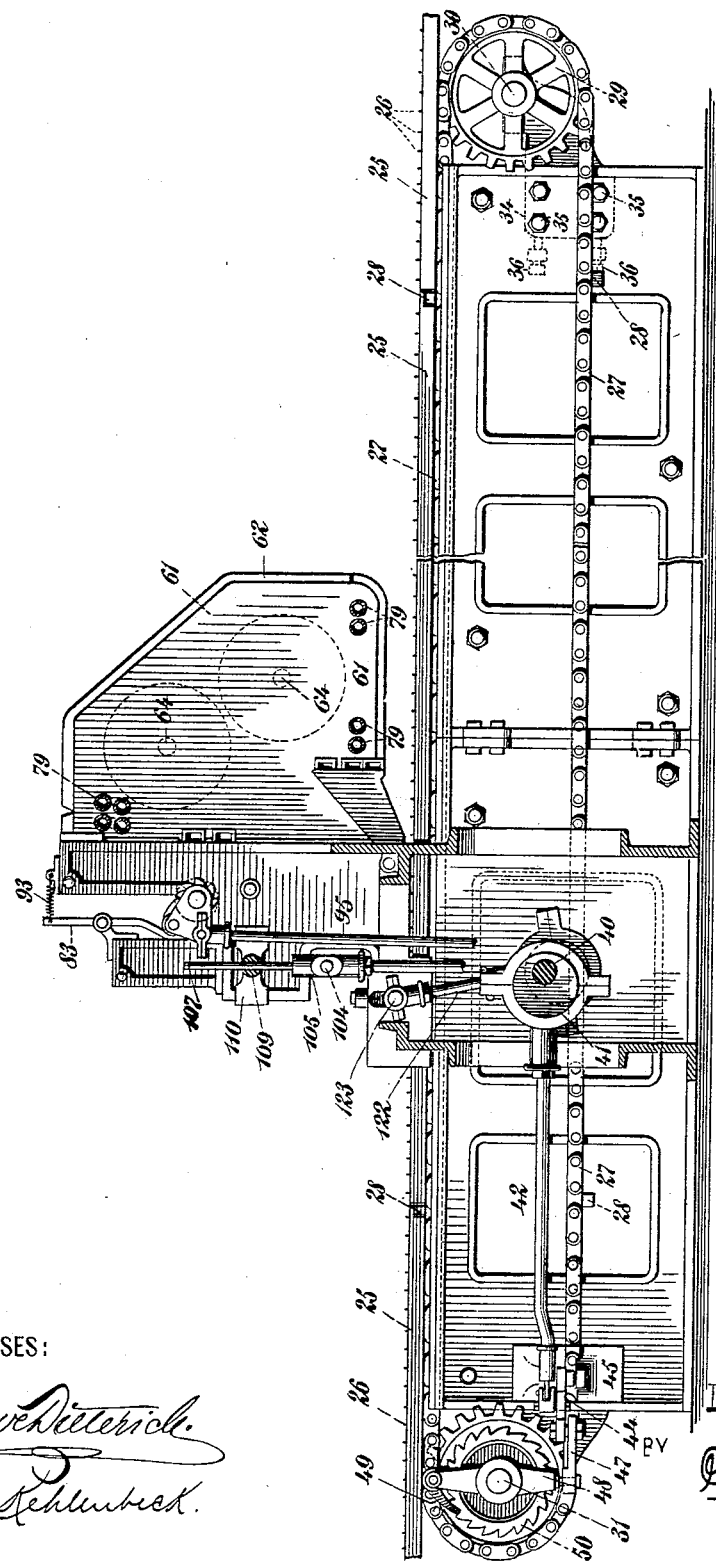

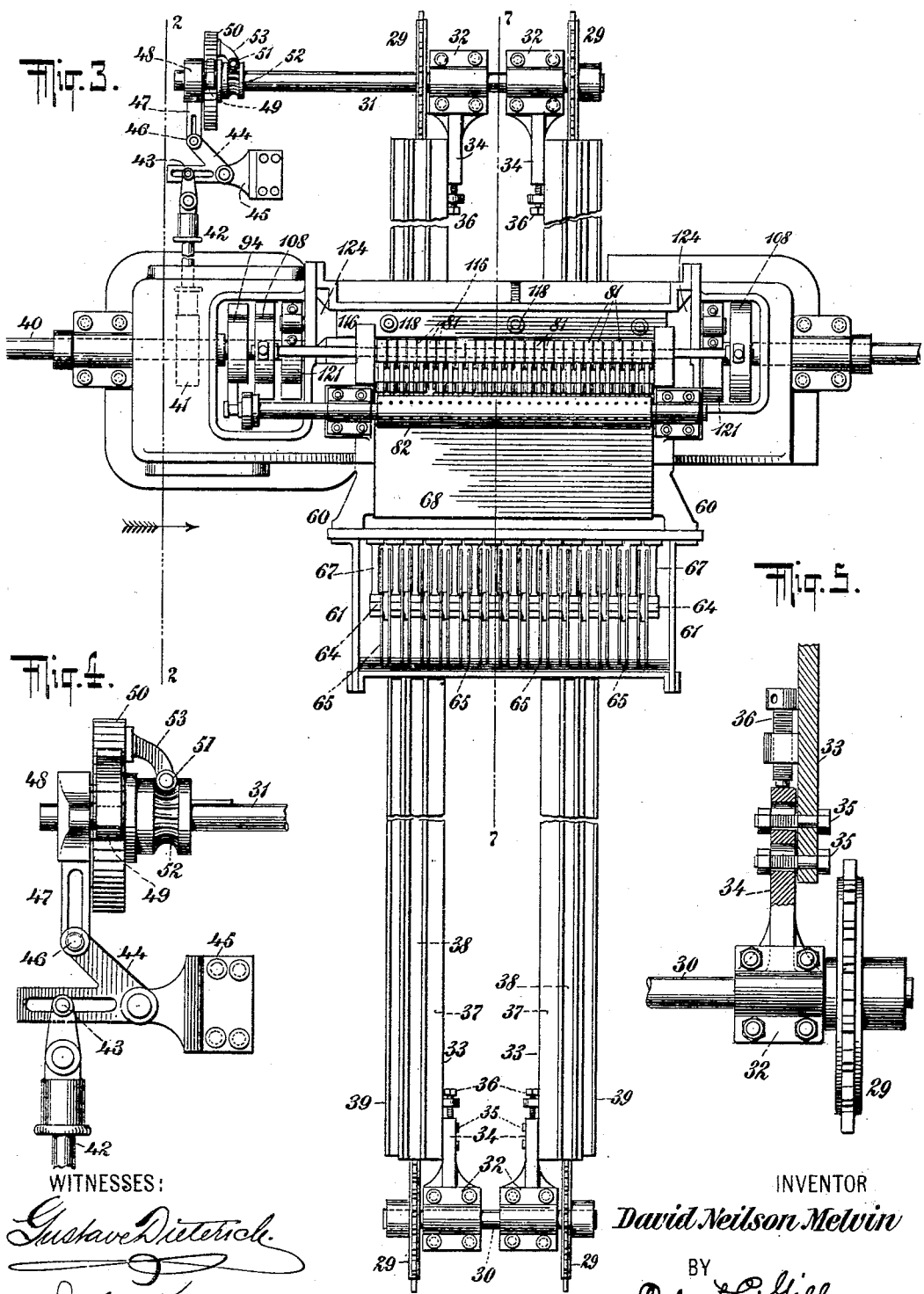

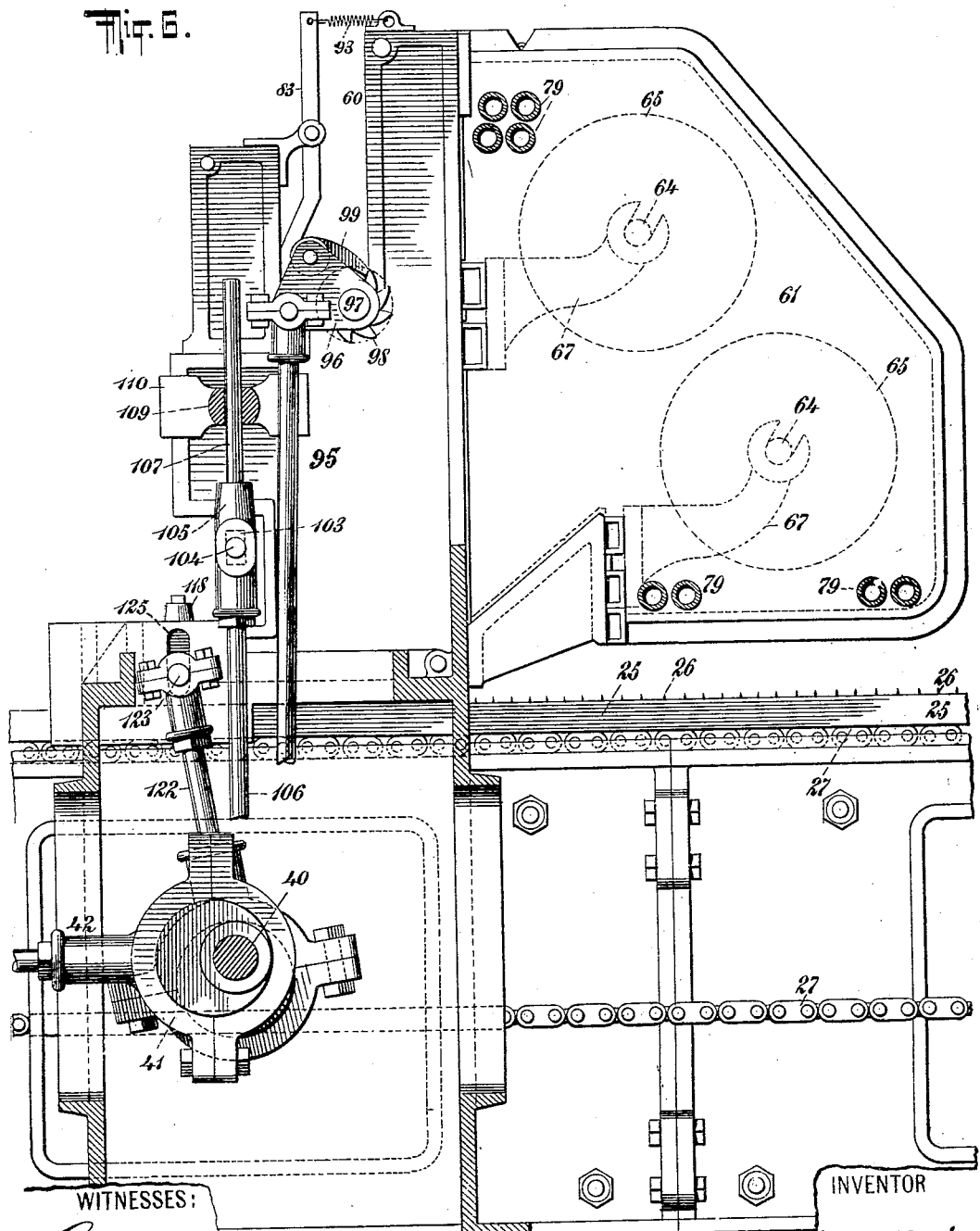

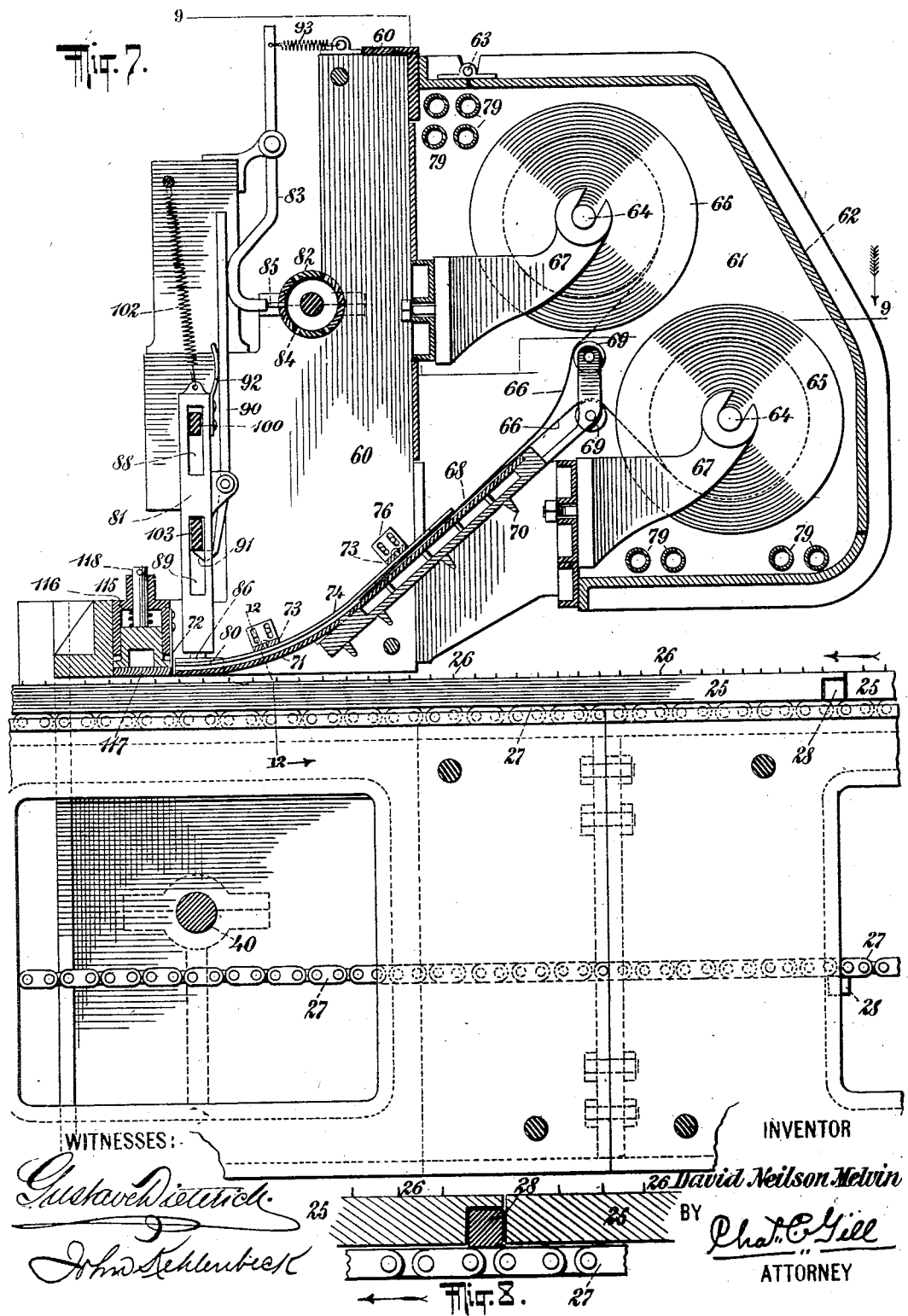

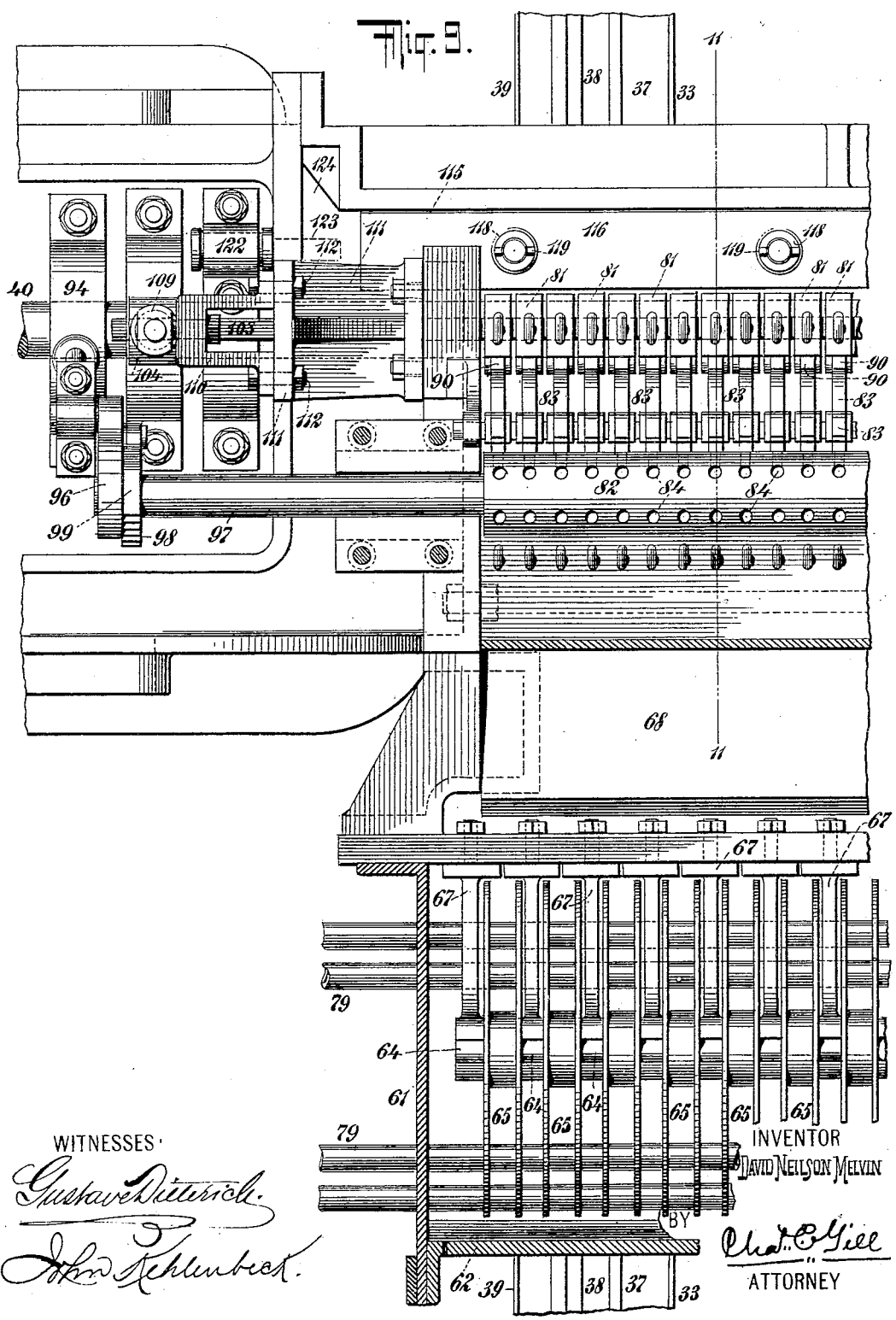

No. 704,068. Patented July 8, 1902.
D. N. MELVIN.
MACHINE FOR THE MANUFACTURE OF INLAID LINOLEUM.
(Application filed Oct. 23, 1901.)
(No Model.) 9 Sheets—Sheet 7.

WITNESSES
Gustave Dieterich
John Kehlenbeck

INVENTOR
David Neilson Melvin
BY
Chas. C. Gill
ATTORNEY

No. 704,068. Patented July 8, 1902.
D. N. MELVIN.
MACHINE FOR THE MANUFACTURE OF INLAID LINOLEUM.
(Application filed Oct. 23, 1901.)
(No Model.) 9 Sheets—Sheet 8.

No. 704,068. Patented July 8, 1902.
D. N. MELVIN.
MACHINE FOR THE MANUFACTURE OF INLAID LINOLEUM.
(Application filed Oct. 23, 1901.)
(No Model.) 9 Sheets—Sheet 9.

WITNESSES:

INVENTOR
David Neilson Melvin
BY
ATTORNEY

UNITED STATES PATENT OFFICE.

DAVID NEILSON MELVIN, OF LINOLEUMVILLE, NEW YORK.

MACHINE FOR THE MANUFACTURE OF INLAID LINOLEUM.

SPECIFICATION forming part of Letters Patent No. 704,068, dated July 8, 1902.

Application filed October 23, 1901. Serial No. 79,698. (No model.)

*To all whom it may concern:*

Be it known that I, DAVID NEILSON MELVIN, a subject of the King of Great Britain, and a resident of Linoleumville, in the county of Richmond and State of New York, have invented certain new and useful Improvements in Machines for Use in the Manufacture of Inlaid Linoleum Floor-Cloth, of which the following is a specification.

The invention relates to machines for use in the manufacture of inlaid linoleum floor-cloth; and it consists in the novel features, arrangements, and combinations of parts hereinafter described, and particularly pointed out in the claims.

The object of the invention is to produce a machine by which in an automatic and expeditious manner pieces or tesseræ of linoleum composition may be formed and applied upon a pattern or pin block in the desired predetermined arrangement preparatory to their transfer to the canvas or other foundation, to which they are secured by pressure.

In Letters Patent of the United States No. 412,279, granted to me on October 8, 1889, is described a process of manufacturing inlaid linoleum floor-cloth in which the pieces or tesseræ previously cut from sheets of composition are arranged by hand in the desired outline or pattern upon a pattern or pin block and the latter then inverted upon the canvas foundation and subjected to pressure for the purpose of causing the tesseræ to adhere to the canvas and leave the block when the latter is thereafter lifted therefrom, the pattern formed by the tesseræ remaining on the canvas and being thereafter subjected to pressure and heat to effect the adhesion of the tesseræ to the foundation and the coalescing of their meeting edges.

In accordance with the present invention I provide a machine for automatically and rapidly cutting the tesseræ or pieces from ribbons or strips of the composition and directly applying them upon the pattern or pin block while the latter is traveling intermittently through the machine, said pattern or pin block after receiving all the tesseræ being utilized in the manufacture of the floor-cloth in the manner described in my said Letters Patent No. 412,279 or in any usual or suitable way. The blocks upon which the tesseræ are placed in the desired outline or pattern have distributed over their surface small projecting pins for holding the tesseræ, as described in said Patent No. 412,279, and hence are sometimes called "pin-blocks."

In its preferred embodiment the machine of my invention will comprise a traveling means, such as a sprocket chain or belt, for carrying by intermittent movements the pin or pattern blocks continuously through the machine, one or more series of spools carrying ribbons or strips of linoleum composition, a feed-plate below the said spools and over which the ribbons or strips of composition are fed downward, a cutting-knife for cutting off from the ends of said ribbons or strips the pieces or tesseræ, means for feeding predetermined lengths of the strips beyond the cutting-knife for severance thereby, and means for pressing the tesseræ upon the pattern or pin blocks.

The machine will also comprise a perforated roller and a series of levers for coöperation therewith for determining just which of the ribbons or strips of composition shall be fed to the aforesaid cutting-knife, the said roller being perforated in accordance with the special pattern to be deposited on the pin-blocks and governing the operation of the means for feeding the ribbons or strips.

In the more generic embodiment of the invention the pin-blocks upon which the tesseræ are applied are to be considered simply as a foundation and not specifically as pin-blocks from which the tesseræ are to be transferred to the canvas or other fabric, for the reason that the machine made the subject of this application is capable of successful use in applying the tesseræ directly to the canvas or other foundation instead of to the pin-blocks. When the tesseræ are applied to the pin-blocks, the machine of the same construction may be smaller in size, for the reason that the pin-blocks may be fed into the machine endwise, (or with the plane of their narrower width transverse of the machine,) which would mean that the machine would be adapted to the narrower width of the pin-blocks, this being from about eighteen to twenty inches broad, instead of to the entire width of the canvas backing, which should ordinarily be about six feet wide.

The invention and satisfactory means for carrying the same into effect will be fully understood from the detailed description hereinafter presented, reference being had to the accompanying drawings, in which—

Figure 11:
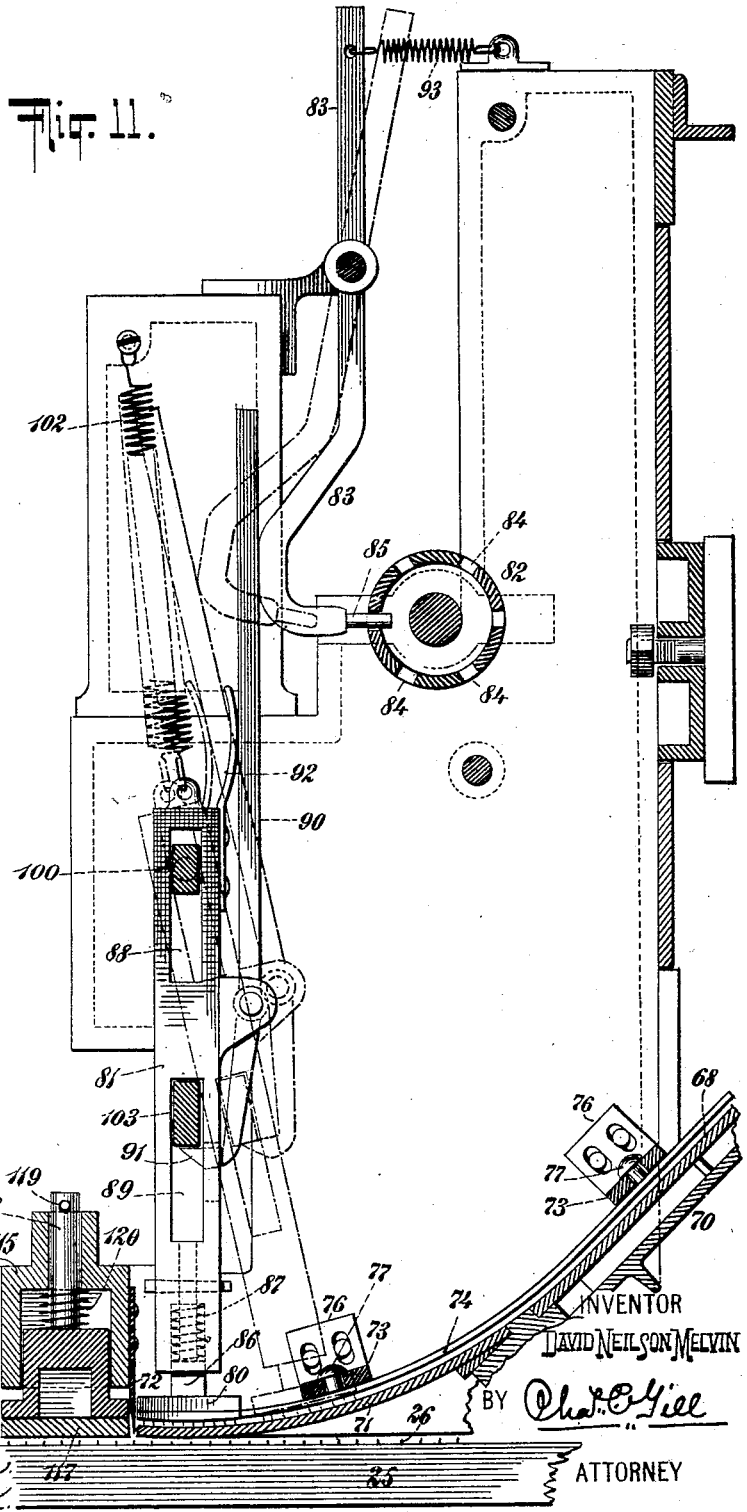
Figure 12:
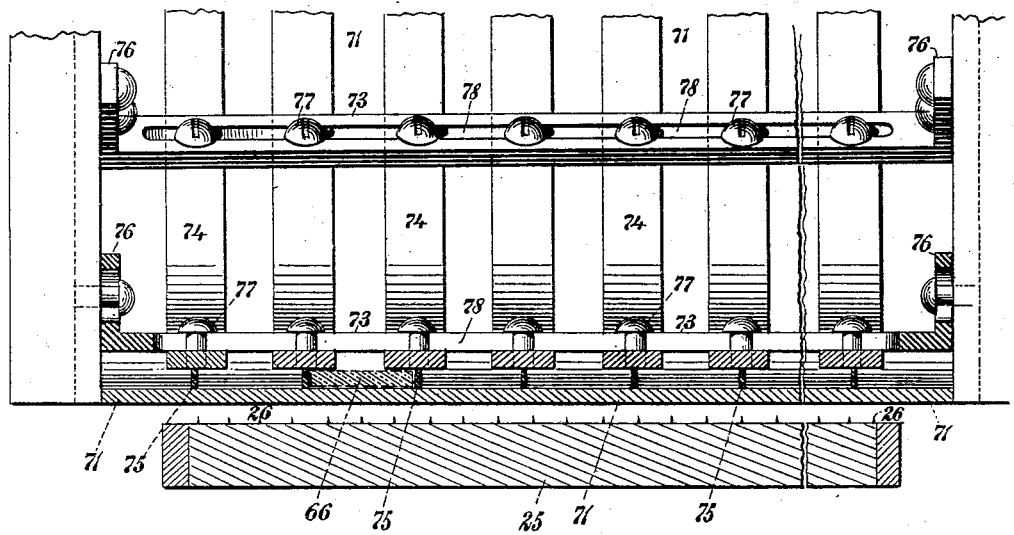
Figure 13:
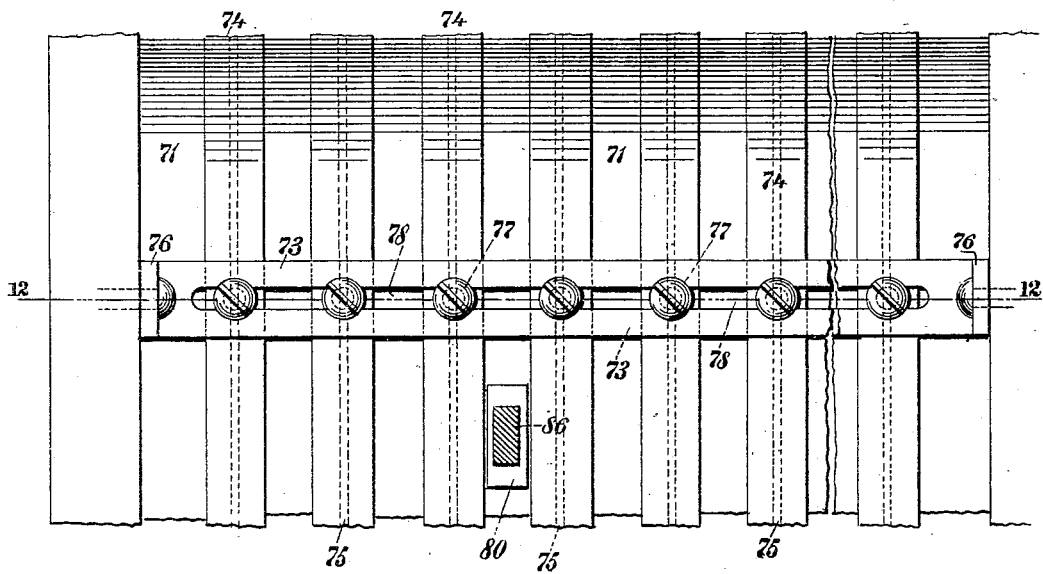

Figure 1 is a front elevation of a machine constructed in accordance with and embodying the invention, the omitted portions being the upper inclosing casing, the spools for holding the ribbons of linoleum composition, and a feed-plate over which the ends of said ribbons are fed to the cutting-knife. Fig. 2 is a side elevation, partly broken away and partly in section, of same, the exterior casing and ribbon-spools being indicated in this figure and the section being on the dotted line 2 2 of Fig. 3. Fig. 3 is a top view, partly broken away, of said machine. Fig. 4 is an enlarged detached top view of a part of the mechanism connected with one of the shafts of the sprocket-wheels for the intermittently-moving chains for carrying the pin-blocks. Fig. 5 is a top view, partly in section, of one of the sprocket-wheels, its shaft, and the means for adjusting the position of the said shaft longitudinally. Fig. 6 is an enlarged side elevation, partly in section, corresponding with Fig. 2, of a portion of the machine. Fig. 7 is an enlarged vertical section of a portion of the machine on the dotted line 7 7 of Fig. 3. Fig. 8 is an enlarged section through a portion of two of the pin-blocks and showing their relation to one another and to the sprocket-chains. Fig. 9 is an enlarged top view, partly broken away and partly in horizontal section, on the dotted line 9 9 of Fig. 7, of a portion of the machine. Fig. 10 is an enlarged front elevation, partly in section and partly broken away, of a portion of the machine. Fig. 11 is a central vertical section on the dotted line 11 11 of Fig. 9, of a portion of the machine, this figure being intended to illustrate the means for feeding the strips of linoleum composition, cutting the pieces or tesseræ therefrom, and applying the same to the pin-blocks. Fig. 12 is a vertical section, on an enlarged scale, of a part of the machine on the dotted line 12 12 of Fig. 7 and also on the dotted line 12 12 of Fig. 13; and Fig. 13 is a top view, partly in section, of a part of the feed-plate over which the composition ribbons are led.

The machine comprises the means for carrying the pattern or pin blocks and the means for forming and applying the tesseræ to said pin-blocks, and first I will refer to the pattern or pin blocks with the means for moving the same.

In the drawings, 25 denotes the pin-blocks, which will have over their surface the well-known short pins 26 for holding the tesseræ. The pin-blocks 25 may be given any suitable dimensions; but they may, with advantage, be made seventy-five inches long, two inches thick, and from eighteen to twenty inches broad, and said blocks are usually of hard wood. The pin-blocks 25 are placed upon sprocket-chains 27 and are by the latter carried through the machine, and said sprocket-chains 27 are equipped with lugs 28 to engage recesses formed in the rear ends of the blocks 25, so that said lugs may push the blocks 25 along with them without interfering with the upper surface of said blocks.

The blocks 25 are not separately claimed in this application, and hence they will be of any suitable or usual construction.

The sprocket-chains 27 are mounted upon sprocket-wheels 29, disposed at opposite ends of the machine, as shown in Fig. 3, and said sprocket-wheels 29 are mounted upon horizontal shafts 30 31, the latter being the power-shaft for driving said chains 27 by an intermittent movement. The shafts 30 31 are mounted in suitable bearings 32, and these bearings are secured to the side frames 33 33 of the machine by means of the arms 34, which are slotted, as shown in Fig. 5, to receive the securing-bolts 35. Upon the side frames 33 are provided adjusting-screws 36, which when the bolts 35 are loosened may be utilized for adjusting the tension of the sprocket-chains 27. The side frames 33 will be provided at their upper edges with horizontal table portions 37, within which will be formed longitudinal grooves or tramways 38 for the sprocket-chains 27, so as to guide said chains during their traveling movement. The pin-blocks 25 rest upon the chains 27, as denoted in Figs. 1 and 10, and said pin-blocks 25 are guided at their edges by means of the right-angular frames 39, extending laterally and then upward from the side frames 33.

The shaft 31 for driving the sprocket-wheels 29 and sprocket-chains 27 receives its motion from the main power-shaft 40, upon which is provided the eccentric 41, whose rod 42 is connected by a pin 43, Figs. 3 and 4, with the bell-crank lever 44, pivotally secured to a rigid bracket 45 and having its rear arm connected by a pin 46 with a slotted arm 47, extending frontward from an oscillatory arm 48, carrying a pawl 49 and being pivotally and loosely mounted upon the aforesaid shaft 31. The pawl 49 engages the teeth of a ratchet-wheel 50, rigidly mounted upon the shaft 31. During the rotation of the shaft 40 its motion will be communicated to the eccentric-rod 42, bell-crank lever 44, and pawl-arm 48, causing the latter to have a vibratory motion upon the end of the shaft 31 and effecting through the pawl 49 and ratchet-wheel 50 the rotation of the shaft 31 during the movement in one direction of said pawl-arm 48. The pawl 49 slides freely over the teeth of the wheel 50 when the pawl-arm 48 is moving in one direction and will engage the teeth of said wheel 50 and rotate said wheel during the movements of said pawl-arm 48 in the opposite direction. The eccentric 41 and the connections just hereinbefore described intermediate said eccentric and the shaft 31 will impart to said shaft an intermittent motion, and the extent of each intermittent movement of the shaft 31 should be subject to control, since the same will vary in accordance with the pattern being produced upon the pin-blocks 25 and the sizes of the pieces or tesseræ of linoleum composition being applied to said blocks, and as suitable means for controlling the movements of the shaft 31 and the consequent movements of the sprocket-chains 27 I slot the arm of the bell-crank lever 44 to permit the adjustment therein of the pin 43 toward or from the pivot or turning-point of said bell-crank lever 44, whereby the extent of movement which shall be imparted to said bell-crank lever may be regulated at will. The arm 47, receiving the pin 46, connected with the bell-crank lever 44, is also slotted to permit of adjustment for aiding in regulating the throw of the pawl-arm 48 and pawl 49. There may be occasions, also, when it will be desired to turn the shaft 31 to a slight extent independently of the power-shaft 40 and pawl-arm 49 for the purpose of adjusting the pin-blocks 25 in proper relation to the means for forming and applying the tesseræ upon said blocks, and to this end I provide the worm 51 and pinion 52, the latter receiving the worm 51, and said worm being mounted in a bracket 53, secured upon the inner face of the ratchet-wheel 50. The worm 51 may be turned by a wrench or key applied to its end. The pinion 52 is rigid with or keyed upon the shaft 31, and the ratchet-wheel 50 is loose upon the hub of said pinion-wheel 52. The movement of the ratchet-wheel 50 by means of the pawl 49 is communicated to the shaft 31 through the bracket-arm 53, worm 51, and pinion 52, said worm and pinion fastening the ratchet-wheel 50 to the shaft 31, but said shaft 31 and pinion 52 being capable of rotation under the action of the worm 51 independently of said ratchet-wheel 50. When the worm 51 is turned by a wrench or key, it will cause the pinion 52 and shaft 31 to rotate while the ratchet-wheel 50 remains stationary, and this rotation of the shaft 31 is, as hereinbefore indicated, for the purpose of imparting a slight movement to the sprocket-wheels 29 and sprocket-chains 27, whereby to adjust the relation of the pin-blocks 25, carried by said chains, to the tesseræ forming and applying mechanism. Thus the shaft 31 will during the usual operation of the machine have motion imparted to it from the main power-shaft 40; but said shaft 31 may be turned independently of the power-shaft 40 when it is desired to move the sprocket-chains 29 for nicely adjusting the pin-blocks 25 with relation to the other parts of the machine.

The means for forming and applying the tesseræ upon the pattern or pin blocks 25 is, in the main, superposed over the sprocket-chains 27 and the pin-blocks mounted thereon, as indicated in Fig. 2. Extending upward at the opposite sides of the frames 33 and sprocket-chains 27 are the main side frames 60 60, which at the front end of the machine support the sides 61 61 of an inclosing frame in the nature of a hood for inclosing a part of the mechanism and having the hinged door 62, which may be opened upward on the hinge 63, Fig. 7, so as to expose the interior of said hood. The hood formed by the sides 61 and hinged door 62 may be of any suitable construction, since it, in the main, simply forms an inclosure for the shaft or shafts 64, carrying the series of spools 65, upon which are wound the strips or ribbons of linoleum composition 66, from which the tesseræ are formed. One or more shafts 64, carrying the series of spools 65, may be employed, in accordance with the particular nature of the pattern to be produced; but in the accompanying drawings I illustrate two of the shafts 64, each carrying a series of spools 65, and, as may be observed on reference to Figs. 7 and 9, the shafts 64 are mounted in permanently-placed bearing-brackets 67, whose thickness keeps the spools 65 separated a definite distance apart. When two series of spools 65 are made use of, one series of said spools will alternate in position with the other series of said spools—that is to say, that the spools of one series will be intermediate the spools of the other series, the spools being thus arranged in staggered order, so that the ribbons or strips emanating from them may lie flat upon the feed-table 68 with their edges parallel to one another. The spools 65 are not of unusual construction, being composed of a hub and disks, as usual, and mounted upon the shafts 64, which are removably mounted in bifurcated ends of the bearing-brackets 67, so that they may be readily elevated from or applied to said brackets. When the door 62 is opened, the spools 65 will be fully exposed, and they and their shafts 64 may be removed from or applied to the position shown with convenience and facility. The ribbons or strips of linoleum composition will be applied to the spools 65, and the latter will then be applied to the shafts 64 and said shafts then placed on the machine and within the bearing-brackets 67. The spools 65 may be resupplied with the ribbons or strips 66 of linoleum composition as often as may be required, and during the passage of the ribbons or strips 66 from the spools 65 they will preferably be carried over rollers 69 of absorbent material and containing oil, so that the lower surface of the said strips or ribbons may be oiled and be thus prevented from sticking to the feed-plate 68 on the passage of said ribbons or strips downward to the cutting and applying mechanism. The ribbons or strips 66 are fed from the spools 65 by being pulled therefrom by the means hereinafter described, said means being regulatable so that only the predetermined extent of the strips or ribbons may be pulled from said spools 65 at a time, the feeding of said strips or ribbons 66 being by intermediate movements.

The feed-plate 68, over which the ribbons or strips 66 are fed, inclines downward, as shown in Fig. 7, and is in the form of a hollow frame 70, containing coiled or serpentine passages, through which a refrigerant will be circulated in order that said frame may be kept cooled and the linoleum composition be thus rendered less likely to adhere to the same and be prepared in the most effective manner for having the tesseræ cut therefrom and applied to the pin-blocks 25. The frame 70 is in the nature of a cooled table, over which the linoleum strips 66 are fed, and the frame 70, whose upper surface forms the feed-plate 68, is continued downward by a feed-plate 71, which passes entirely downward to a cutting-knife 72, hereinafter described, by which the ends of the strips or ribbons 66 are severed to form the tesseræ. The ribbons or strips 66 lie parallel to one another upon the feed-plates 68 and 71, and above these plates 68 and 71 is secured the framework composed of the transverse bars 73, longitudinal strips 74, carried thereby, and thin steel partitions 75, carried by said strips 74. The transverse bars 73 have their ends turned upward to form brackets 76, which are slotted and secured to the side frames 60 by means of screws passing through the slots in said brackets, the purpose of the slots being to permit of the adjustment toward and from the plates 68 71 of said transverse bars 73, with the parts carried thereby, it being desirable to provide for this adjustment so that the ribbons or strips 66 of linoleum composition, varying in thickness, may be properly fed downward over said plates 68 71. The longitudinal strips 74 are of metal and secured to the transverse bars 73 by means of screws 77, which pass downward through slots 78 in the transverse bars 73, as more clearly illustrated in Figs. 12 and 13. The purpose of the slots 78 in the transverse bars 73 is to permit of the adjustment of the strips 74 toward one another in accordance with the width of the strips or ribbons 66 of linoleum composition being fed upon the plates 68 and 71. The partitions 75 are fastened lengthwise of and centrally along the lower surface of the strips 74, and these partitions 75 are employed to separate the linoleum ribbons or strips 66 from each other during their downward travel to the cutting-knife 72, and in Fig. 12 I illustrate one of the linoleum strips 66 in position intermediate two of the partitions 75. The ribbons or strips of linoleum 66 pass between the upper surface of the plates 68 71 and below the metal strips 74, and they are confined at their edges by means of the partitions 75. The partitions 75 should be in reasonably close relation to the edges of the linoleum strips 66, and the width of the linoleum strips 66 will vary in accordance with the pattern being produced, and hence it is desirable that provision be made for the adjustment of the partitions 75 and their supporting-strips 74 toward and from one another, this in the present instance being accomplished by the screws 77 and transverse slots 78.

The chamber inclosing the series of spools 65 should be kept cool, for it will be desired to employ the linoleum composition when in a fresh or unseasoned condition, and to this end I provide at any suitable points pipes 79, Fig. 7, through which I propose to circulate brine or other refrigerant according to well-known principles.

The knife 72, herebefore referred to, has a vertical reciprocation and severs so much from the ends of the linoleum strips 66 as may have been fed onward beyond the feed-plate 71 and over the pattern or pin-block 25, and during the regular operation of the machine all or any number of the ribbons or strips 66 may or may not be fed beyond the feed-plate 71 with each ascent of the knife 72 in accordance with the pattern to be produced upon the pin-block 25.

The means for feeding the strips or ribbons 66 comprise a series of feet 80, having pins on their lower surface to engage the linoleum composition and being carried by the vertically-disposed bars 81, there being one foot 80 and one bar 81 for each ribbon 66 and said feet 80 being of proper width to enter between the metal strips 74 of the framework immediately over the feed-plates 68 71. All of the feet 80 may feed the strips 66 at one time, or some of said feet 80 may be kept out of operation while others thereof are operating in accordance with the pattern to be produced on the pin-block 25, and the means for determining the action of the feet 80 comprise the pattern-roller 82 and the series of levers 83, there being one lever 83 for each foot 80 and ribbon 66 and said roller 82 having perforations 84 to receive the pin ends 85 of said levers 83, as shown in Fig. 11. The perforations 84 in the roller 82 are prearranged in accordance with and to effect the production of the desired pattern on the pin-block 25, and the roller 82 consequently determines the feeding of the ribbons 66. It may be here briefly said that when an aperture 84 of the roller 82 presents itself to and receives the pin end 85 of a lever 83 the foot 80 in operative relation with said special lever 83 will feed a ribbon 66 for the severance from the end thereof of one piece by means of the knife 72, and when a solid surface of the roller 82 presents itself to the pin end 85 of the lever 83, and thus prevents the lever 83 from having a full movement, the foot 80 having relation to said special lever 83 will be kept from operating, and consequently will not feed its ribbon 66, thus leaving a blank space on the pin-block 25 to be filled by another machine feeding ribbons 66 of another color, as hereinafter explained.

The feet 80 have their stems 86 entered and adapted to move vertically within sockets formed in the lower ends of the bars 81, Fig. 11, and in said sockets are provided coiled springs 87 for cushioning the feet 80.

The bars 81 are formed with the vertical slots 88 89, and each bar 81 has pivoted to it an arm 90, having a hook 91 at its lower end and having its upper portion pressed, by means of a spring 92, against the lower end or portion of one of the levers 83, there being one arm 90 for each lever 83. Each lever 83 is connected at its upper end with a spring 93, whose tension is exerted to press the lower portion of the lever against an arm 90 and away from the pattern-roller 82.

The roller 82 has an intermittent rotary motion imparted to it from the driving-shaft 40 through the eccentric 94 thereon, Fig. 10, eccentric-rod 95, Figs. 6 and 10, bell-crank lever 96, loosely mounted at one end upon the spindle 97 of the said roller 82 and at its other end pivotally connected with the rod 95, ratchet-wheel 98, rigid on said spindle, and pawl 99, carried by said lever 96 and engaging said ratchet-wheel.

The bars 81, carrying the shoes 80, are adapted to have a pivotal action on the bar 100, which passes transversely through the slots 88 of all said bars 81 and at its ends is rounded, as at 101 in Fig. 10, and held within bearing-apertures in the side frames of the machine. The bar 100 is loosely held at its ends 101, so that it may turn or oscillate with the bars 81 when the latter are moved, said bar 100 receiving its motion from the bars 81 and having motion simply to accommodate itself to said bars. The bar 100 is within the slots 88 of the bars 81, so that said bars 81 may have vertical movement imparted to them.

The bars 81 are each suspended by a coiled spring 102, Fig. 11, and through the elongated slots 89 of the bars 81 passes a flat rod 103, Figs. 1, 10, and 11, whose ends project through the side frames of the machine and have their rounded or pivot extremities 104, Figs. 6 and 10, loosely resting within the bearing-blocks 105, secured to the eccentric-rods 106 and having at their upper ends the rods 107. The rods 106 are driven from the main power-shaft 40 through the eccentrics 108 thereon, and the rods 107 pass freely through swiveled eyes or bearings 109, carried by vertically-adjustable brackets 110, secured on the outer face of the frames 111 by bolts 112, passing through slots 113 in said frames 111. The eyes or bearings 109 constitute pivot-points for the swinging or oscillatory motion of the rods 107, and the adjustment of the brackets 110 is to effect the vertical adjustment of the said eyes 109, so as to control or determine the extent of oscillatory motion said rods 107 shall have.

The bar 103 has vertical motion imparted to it and will at the proper time impart vertical motion to the bars 81, carrying the feet 80. The position of the bar 103 in Fig. 6 does not correspond with the position of said bar as shown in Fig. 7. When the hooks 91 of the arms 90 are in engagement with the lower edges of the bar 103, as shown by full lines in Fig. 11, the said arms 90 (carried by the bars 81) each serves to lock its bar 81 firmly to the bar 103, said bar 103 being confined between the upper wall of the slots 89 and said hooks, and under such condition the bars 81 and bar 103 will move in unison and the bar 103 will be enabled to impart its movement to the bars 81. When, however, the arms 90 are turned so that their lower hook-shaped ends 91 are freed from the bar 103, the vertical movement of the bar 103 will have no operative effect upon the bars 81, since at such time the bars 81 will not be locked to the bar 103 and the bar 103 will be enabled to have independent vertical movement within the slots 89 of the bars 81. The springs 92, Fig. 11, normally retain the hooks 91 of the arms 90 against the lower edge of the bar 103, and hence in the normal condition of the machine the bars 81 and bar 103 will be locked and move together. So long as the bars 81 and bar 103 are locked together by the hooks 91, forming a part of the arms 90, the feet 80 will be in position to feed the linoleum strips downward beyond the edge of the steel feed-plate 71 to the cutting-knife; but since it is not desired that with each movement of the bar 103 all of the bars 81 and feet 80 shall operate to feed the linoleum strips downward (for should all of the feet 80 thus operate with each movement of the bar 103 the pin-block 25 would simply be covered with the pieces of linoleum cut from the strips 66 and no blank spaces would be left thereon for pieces of different colors) the pattern-roller 82 and levers 83 are provided to determine when the feet 80 shall and shall not operate to feed the linoleum strips. The eccentrics 108, operating on the bar 103 and through said bar on the series of bars 81, cause the shoes 80 and bars 81 to have a somewhat circular motion or to travel in the path of a cycle, while in proper timing therewith the roller 82 performs its intermittent rotation and the levers 83 are held by the springs 93 in contact with the edges of the arms 90. The tension of the springs 93 is not sufficient to cause the lower portions of the levers 83, pressing against the upper portions of the arms 90, to dislodge the hooks 91 from below the bar 103. Whenever during the operation of the machine the roller 82 presents one of its apertures 84 to a position enabling the pin 85 of a lever 83 to enter the same, the said lever 83 will be enabled to perform its full movement and the arm 90, bar 81, and bar 103 will be locked and moved together; but when during the operation of the machine the roller 82 presents a solid surface in the path of the pin 85 of the lever 83 the said lever 83 will be arrested before completing its full movement and will constitute an obstruction in the path of the upper portion of the adjacent arm 90, whereby said portion of the arm 90 becoming arrested while its bar 81 is moving the hook 91 of said arm 90 will be turned from below the bar 103, thus unlocking the arm 81 from said bar and allowing the bar 103 to move within the slot 89 and the spring 102 to elevate said bar 81 with its foot 80 to such height that said foot cannot during the motion of the machine contact with the strip of linoleum 66 in line with it. When the bar 81 is thus unlocked from the bar 103, said bar and its foot 80 are thrown out of operation, because under such condition the bar 103 cannot impart to the said bar 81 the proper movement enabling its foot 80 to engage the strip 66 of linoleum in line with it. The unlocking of the bar 81 from the bar 103 is thus effected by the presentation of a solid surface of the roller 82 to the pin 85 of the lever 83, whereby the lever 83 is made to constitute an obstruction against which the arm 90 is moved and which at such time compels said arm to turn on its pivot in opposition to the force of the spring 92 and withdraw its hook 91 from the said bar 103. The pattern-roller 82 will have its apertures 84 and its solid surfaces disposed in accordance with the pattern to be produced on the pin-block 25, and hence any portion of the bars 81 may be unlocked from the bar 103, while the remaining portion of said bars 81 may remain locked to said bar 103, the unlocking of the bars 81 from the bar 103 being determined wholly by whether the roller 82 presents apertures or solid surfaces to the pins 85 of the levers 83. Those bars 81 which remain locked to the bar 103 will through their feet 80 perform the function of feeding downward the linoleum strips 66, and those bars 81 which become unlocked from the bar 103 will omit to engage and feed the linoleum strips, and at the points where they would have fed the linoleum strips 66 had they been in operative connection with the bar 103 will be left on the pin-block 25 blank spaces to be filled with linoleum of a different color by means of another machine, as hereinafter explained.

The unlocking of the arms 90 from the bar 103 always takes place when such unlocking becomes necessary, when the bar 103 and bars 81 are moving frontward to reach the dotted position shown in Fig. 11, and such arms 90 as thus become unlocked from the bar 103 remain in such condition until the bar 103 returns to the position in which it is shown by full lines in Fig. 11 and then ascends to its upper position, upon reaching which it will have passed into the upper ends of the slots 89 of the bars 81 in position for the hooks 91 of the arms 90 to move below and engage it, whereby the bars 81, which became inoperative, are automatically restored to their operative relation to the bar 103 whenever the roller 82 presents apertures to the pins 85 of the levers 83 for said bars 81 in accordance with the pattern to be produced. When the roller 82 presents solid surfaces to all of the levers 83, all of the arms 90 will become unlocked from the bar 103 and all of the bars 81 will become inoperative; but should on the next movement of the bar 103 the roller 82 present apertures to all the levers 83 said bar 103 upon reaching its upper position and entering the upper ends of the slots 89 of the bars 81 would become engaged by all of the arms 90 and all of the bars 81 would become automatically restored to operative relation to the bar 103. The restoration of the bars 81 to operative relation to the bar 103 depends upon whether the roller 82 presents apertures to the levers 83, provided for coöperation with the arms 90 of said bars 81, and all or only a part of the bars 81 may be restored to operative relation to the bar 103 at each movement of the latter in accordance with the pattern defined by the apertures of the roller 82. The springs 102, suspending the bars 81, do not hold the said bars 81 at such height as to prevent the bar 103 from reaching the upper ends of the slots 89 of said bars 81 when it attains its full upward position to be engaged by the hooks 91 of the arms 90.

In explaining the movement of the bars 81 and their shoes 80 it may be well to consider that the shoes 80 have assumed the position shown in Fig. 11 and completed the feeding downward of the ribbons or strips 66 of the linoleum composition. Starting from this point and the eccentrics 108 being in motion, the bar 103 will ascend and move the bars 81 with it, thereby elevating the shoes 80 from the linoleum strips 66 below them. When the bars 81 are thus elevated, the springs 87 in their lower ends will press the shoes 80 downward; but, nevertheless, the elevation of the bars 81 will be sufficient to elevate the shoes 80 clear of the linoleum strips. The bar 103 and bars 81 will under the action of the eccentrics 108 and the confinement of the rods 107 in the swiveled eyes or bearings 109 be moved frontward toward the position in which said parts are illustrated by dotted lines in Fig. 11 and then downward upon the linoleum strips 66 to the position shown by dotted lines in Fig. 11 and then rearward to the position in which said parts are shown by full lines in Fig. 11, this rearward motion of the bars 81 and feet 80 causing said shoes through the engagement of their pins with the linoleum strips to pull said strips downward and feed a definite length of same upon the pin-block 25 at a point beyond the feed-plate 71 and knife 72. The bars 81 and shoes 80 upon reaching the position in which they are shown by full lines in Fig. 11 will then ascend and repeat the movement just above described. In this explanation just above given it is assumed that the pattern-roller 82 had turned sufficiently to present its apertures 84 to the pins 85 of the levers 83 and that said levers 83 do not, therefore, cause the withdrawal of the hooks 91 from the bar 103. The bar 103 in the explanation given was therefore enabled to move the bars 81 and feet 80 downward to the lower position. (Shown by dotted lines in Fig. 11.) So long as the apertures of the pattern-roller 82 are presented to pins 85 of the levers 83 the hooks 91 will lock the bars 81 and bar 103 together, and under this condition each movement of the bar 103 will cause all of the levers 81 and shoes 80 to perform their full movement at each cycle of said movement, effecting the feeding downward of the linoleum strips 66. It is not desired, however, that the shoes 80 shall all feed downward the linoleum strips 66 with each movement of the bar 103, and hence in further understanding the feeding operation it may be assumed that the bars 81 are being elevated from the position in which they are shown by full lines in Fig. 11 and that the pattern-roller 82 has turned to present a solid surface to the pins 85 of the levers 83. Under this condition the bar 103 will, while moving toward the front, carry the bars 81 with it; but since the pattern-roller 82 then presents solid surfaces the pins 85 of the levers 83 will be unable to complete a full movement toward the front of the machine and will be arrested by said solid surfaces. The continued movement of the bar 103 with the bars 81 will result in the arms 90 meeting the obstruction furnished by the levers 83 and in being thereby turned against the springs 92 and withdrawing the hooks 91 from below the bar 103, and under this condition the bars 81 (then not being locked to the bar 103) will be pulled upward by the springs 102 and will, in a limited measure, pass through their cycle of movement, but at such elevation that the shoes 80 will not contact with or feed the linoleum strips 66, but remain idle. Under this condition the linoleum strips 66 would not be fed downward upon the pin-block 25 and blank spaces would be left on the pin-block corresponding to the spaces which had previously been filled by the action of the said shoes 80, it being assumed that the pin-block 25 travels onward by intermittent movement after each application thereto of the tesseræ. The bars 81 and shoes 80 thus having returned to their rear position, but above the linoleum strips, not having contacted with the same, and being in their elevated position under the support of the springs 102, the bar 103 will continue on its movement under the action of the eccentrics 108 and the springs 93 will keep the levers 83 pressed against the arms 90, and the pattern-roller 82 will make a further movement, this time, for illustration, presenting its apertures 84 to the pins 85 of said levers 83. Under this condition when the bar 103 and bars 81 move frontward on their cycle the said pins 85 will enter the apertures of the roller 82 and the springs 92 will be enabled to turn the arms 90 for the purpose of restoring their hooks 91 below the bar 103, whereby the bar 103 will be enabled upon reaching its front position and moving downward to carry the bars 81 and shoes 80 downward, so that said shoes 80 may engage and feed the linoleum strips, whereby another length of the pieces of linoleum will be fed upon the pin-block 25. The special pattern being produced might require that only a part of the shoes 80 and bars 81 should act, and under this condition the roller 82 would present apertures 84 to some of the pins 85 and not to others, and under this condition some of the bars 81 would remain elevated and idle, while others, having been locked to the bar 103, would descend and effect the feeding of the linoleum strips. The mechanism intermediate the feet 80 and pattern-roller 82 is for the purpose of determining with the aid of said roller 82 which of the feet 80 shall and which shall not act to feed the linoleum strips and when or at what particular intervals said feet 80 shall act in feeding said strips. The sizes of the pieces of linoleum or tesseræ fed upon the pin-block 25 will vary in accordance with the pattern which it may be desired to produce on said pin-block, and this feature of the operation will be governed by the extent of the orbit or cycle of the shoes 80, and this movement of the shoes may be varied by the vertical adjustment of the brackets 110, carrying the eyes or bearings 109, these eyes or bearings 109 being the pivot-points from which the eccentric-rods 106 and bearing-blocks 105, which carry the bar 103, operate.

That portion of the ends of the linoleum strips 66 fed rearward over the pin-blocks 25 by means of the shoes 80 will pass under the combined knife-carrier and plunger 115, which, as indicated in Fig. 11, comprises a frame 116 and a plunger 117, the latter having its upper portion set within said frame 116 and held therein by means of the vertical pins 118, which pass freely through apertures in said frame 116 and are prevented from escaping downward therefrom by means of the small transverse pins 119. Upon the pins 118 are provided the coiled springs 120, which cushion the plunger 117 and enable said plunger to act upon the linoleum without undue crushing effect. The lower surface of the plunger 117 may consist of a plain piece of hard wood. The knife 72 is rigidly fastened to the combined knife-carrier and plunger, as shown in Fig. 11, and the lower edge of the knife 72, when the knife-carrier and plunger have been pressed downward to their full limit, will project below the lower surface of the plunger 117 and cut through such strips of the linoleum 66 as may be projecting below said plunger and beyond the edge of the steel plate 71, the severing of these portions of linoleum by means of the knife 72 from the strips 66 being accomplished with each descent of the said knife-carrier and plunger 115 and only after the feet 80 have completed their movement in the direction of feeding said strips 66. The linoleum pieces cut from the strips 66 by means of the knife 72 constitute the tesseræ, and they are simultaneously with their severance from the strips 66 pressed upon the pins 26 of the pin-block 25 by means of the plunger 117. With each ascent of the feet 80, knife 72, and plunger 117 the pin-block 25 is moved onward, so as to present blank spaces below the plunger 117 to receive the ends of the linoleum strips 66 then to be fed onward by means of the feet 80.

The combined knife-carrier and plunger 115 has simply a vertical reciprocation imparted to it, and this is accomplished from the main driving-shaft 40 through the eccentrics 121 thereon and eccentric-rods 122, the latter at their upper ends being connected by pins 123 with the ends of the frame 116, constituting a part of said combined knife-carrier and plunger. The ends of the frame 116 are dovetailed, as denoted at 124 in Figs. 3 and 9, and are thereby guided in dovetailed recesses formed in the machine-frame and conforming to said ends 124. The frame 116 is also guided in its vertical movement by reason of the fact that the pins 123, connecting it with the eccentric-rods 122, move in vertical slots 125, formed in the side frames, as shown in Fig. 6.

The operation of the machine hereinbefore described will in large measure be understood from the description hereinbefore presented without further detailed explanation. The pin-blocks 25 are placed upon the sprocket-chains 27, and said chains carry the same by intermittent movements through the machine. The linoleum for the tesseræ is in the shape of ribbons or strips wound upon a series of spools 65, placed side by side upon the shaft 64, the ends of said ribbons or strips 66 being fed downward over the plates 68 and 71 to a cutting-knife 72. The machine being in motion, the shoes 80, connected with the bars 81, will be caused to describe a somewhat circular motion and when in their lower position engage the strips or ribbons 66 of the linoleum composition and feed definite lengths of the same onward from the plate 71 and below the then elevated plunger 117 and knife 72. After each predetermined length of the ribbons or strips 66 has been fed below the plunger 117 the latter and the knife 72 will descend, said knife cutting off said predetermined length from the strips 66 and said plunger 117 affixing the same upon the pin-block 25. After each descent of the knife 72 and plunger 117 the eccentrics 121 will elevate the said plunger and knife, the pin-block 25 will move onward another definite predetermined distance, and the shoes 80 will or will not, as may be required, feed an additional extent of the linoleum strips 66 over the said block 25 and below the plunger 117. The action of the shoes 80 in feeding or omitting to feed the linoleum strips below the plunger 117 will be governed by the pattern-roller 82, and the operation of the said roller 82 with the parts intermediate the same and the shoes 80 has been fully described hereinbefore. During the travel of the pin-blocks 25 through the machine they will preferably be supplied with all of the tesseræ of one color which may be required for the pattern, it being intended that all of the strips or ribbons 66 of the spools 65 in one machine shall be of one color. When the pin-blocks 25 emerge from the machine, they will have upon their surface all of the tesseræ in one color required for the desired pattern, and the said blocks 25 will then be caused to travel through another machine similar to the one hereinbefore described, so that they may have applied to the blank spaces left on their upper surfaces all of the tesseræ of any different color required for the desired pattern, this different color being sufficient to complete some patterns, and if not sufficient to complete any special pattern in hand the pin-blocks 25 will be passed through the third machine, similar to the one hereinbefore described, for forming and applying the tesseræ of such additional color as may be required. I contemplate employing with one pair of chains 27 for carrying the pin-blocks 25 as many of the tesseræ forming and applying machines, superposed above said chains 27, as may be required for completing any usual pattern, each machine having linoleum strips of one color (differing from the color of the linoleum strips in the other machines) and each machine being a duplicate of the other, with the exception of the apertures in the pattern-roller 82, which must vary in accordance with the pattern, so that the feeding, cutting, and applying mechanism of each machine may be adapted to perform its own part in the work of producing the pattern on the pin-blocks 25. In lieu of having several machines, each being provided with spools 65, carrying the linoleum strips of different colors, the blocks 25 may be passed through the one machine several times, so as to complete the entire pattern thereon by the one machine. This method would, however, necessitate the changing of the spools 65 and pattern-roller 82 each time the blocks 25 were carried through the machine by the chains 27, so that the one machine would be enabled to apply the several colors of a pattern in correct places in the pattern.

The supporting-frames 33 for the sprocket-chains 27 are independent of the side frames 60 for the superposed structure of the machine, and this feature is desirable, because in the formation of some patterns upon the pin-blocks or foundation the chains 27 instead of traveling at right angles to the transverse line of the ribbon-spools 65, feet 80, and knife 72 should travel at an angle thereto, so that the tesseræ instead of being applied upon the pin-blocks in the line with the front edge of said blocks may be applied thereto at an angle or on a bias line to said front edge. When it is desired that the tesseræ shall be applied to the pin-blocks at an angle to the front edge of the latter, the superposed structure of the machine will remain in its present condition and the supporting-frames 33 for the sprocket-chains 27 will be shifted laterally at its ends, so that said chains may carry the pin-blocks at the proper angle below the feeding-feet 80 and knife 72.

I do not limit the invention in every instance to the applying of the tesseræ upon the pin-blocks 25, since the invention in its broader scope is capable of applying the tesseræ to any suitable foundation which may be carried through the machine. The pin-blocks furnish a convenient means for receiving the tesseræ and enabling their transfer to the canvas or other foundation; but it will be obvious that the canvas foundation itself may be fed through the machine and directly receive tesseræ upon it, the tesseræ being applied directly upon the canvas or other foundation by means of the feet 80 and plungers 107, the latter pressing against the tesseræ sufficiently to cause the adherence of the same to the canvas or foundation. When the tesseræ are applied directly upon the canvas, the latter, with the tesseræ thereon, will be subjected to the usual heat and pressure for causing the firm adhesion of the tesseræ to the foundation and the coalescing of the meeting edges of the tesseræ, substantially as described in the aforesaid Letters Patent No. 412,279 or by other suitable means.

What I claim as my invention, and desire to secure by Letters Patent, is—

1. In a machine for use in making floor-cloth, the series of spools for the composition ribbons, and a feed-plate over which said ribbons are moved, combined with means for feeding predetermined lengths of said ribbons to and upon a foundation, means for severing such lengths from the ribbons, and means for pressing the same upon said foundation; substantially as set forth.

2. In a machine for use in making floor-cloth, the series of spools for the composition ribbons, a feed-plate over which said ribbons are moved, and means for imparting a step-by-step movement to a foundation, combined with means for feeding predetermined lengths of said ribbons to and upon said foundation, means for severing such lengths from the ribbons, and means for pressing the same upon said foundation; substantially as set forth.

3. In a machine for use in making floor-cloth, the series of spools for the composition ribbons, and a feed-plate over which said ribbons are moved, combined with means for feeding predetermined lengths of said ribbons to and upon a foundation, means for determining when said ribbons shall be fed upon said foundation in accordance with the pattern to be produced thereon, means for severing such lengths from said ribbons, and means for pressing the same upon said foundation; substantially as set forth.

4. In a machine for use in making floor-cloth, means for supporting a series of the composition ribbons, and means for imparting a step-by-step movement to a foundation to receive the tesseræ, combined with means for feeding predetermined lengths of said ribbons to and upon said foundation, means for severing such lengths from said ribbons to form the tesseræ, and means for pressing the same upon said foundation; substantially as set forth.

5. In a machine for use in making floor-cloth, means for supporting a series of the composition ribbons, and means for imparting a step-by-step movement to a foundation to receive the tesseræ, combined with means for feeding predetermined lengths of said ribbons to and upon said foundation, means for determining when said ribbons shall be fed upon said foundation in accordance with the pattern to be produced thereon, means for severing such lengths from said ribbons, and means for pressing the same upon said foundation; substantially as set forth.

6. In a machine for use in making floor-cloth, means for supporting a series of the composition ribbons, and means for moving by a step-by-step movement a foundation through the machine, combined with means for feeding predetermined lengths of said ribbons to and upon said foundation, means for determining when said ribbons shall be fed upon said foundation in accordance with the pattern to be produced thereon, and means for severing such lengths from said ribbons; substantially as set forth.

7. In a machine for use in making floor-cloth, means supporting a series of the composition ribbons in horizontal edge-to-edge order, combined with means for feeding simultaneously predetermined lengths of said ribbons beyond a given line, and means for severing such lengths simultaneously from said ribbons to form the tesseræ; substantially as set forth.

8. In a machine for use in making floor-cloth, means supporting a series of the composition ribbons in horizontal edge-to-edge order, combined with means for feeding predetermined lengths of said ribbons beyond a given line, means for determining when and which of said ribbons shall be fed in accordance with the pattern to be produced, and means for severing such lengths from said ribbons to form the tesseræ; substantially as set forth.

9. In a machine for use in making floor-cloth, means for supporting a series of the composition ribbons, and means for moving by a step-by-step movement a foundation through the machine, combined with means for feeding predetermined lengths of said ribbons to and upon said foundation, means for determining when and which special ones of said ribbons shall be fed upon said foundation in accordance with the pattern to be produced thereon, and means for severing such lengths from said ribbons; substantially as set forth.

10. In a machine for use in making floor-cloth, the series of spools for the composition ribbons, a feed-plate over which said ribbons are moved to and upon a foundation, and means for moving by a step-by-step movement said foundation through the machine, combined with means for feeding predetermined lengths of said ribbons from over said feed-plate and to and upon said foundation, means for determining when said ribbons shall be fed upon said foundation in accordance with the pattern to be produced thereon, and means for severing such lengths from said ribbons; substantially as set forth.

11. In a machine for use in making floor-cloth, means for supporting a series of the composition ribbons, and means for imparting a step-by-step movement to a foundation, combined with a series of yielding feet operable from the power-shaft for feeding predetermined lengths of said ribbons to and upon said foundation, a knife for severing such lengths from said ribbons to form the tesseræ, and a yielding plunger for pressing the tesseræ upon said foundation; substantially as set forth.

12. In a machine for use in making floor-cloth, means for supporting a series of the composition ribbons, combined with the pivotally-mounted bars 81 carrying the feet 80 for feeding predetermined lengths of the said ribbons to and upon a foundation, means for imparting vertical and oscillatory motion to said bars 81, for enabling said feet 80 to feed said ribbons, means for severing such lengths from said ribbons to form the tesseræ, and means for pressing the same upon said foundation; substantially as set forth.

13. In a machine for use in making floor-cloth, means for supporting a series of the composition ribbons, combined with the series of bars 81 having the feet 80 for feeding predetermined lengths of said ribbons to and upon a foundation, means for actuating said bars 81 to cause said feet to effect such feeding, means for throwing some of the said bars 81 out of operation when such result is desired in accordance with the pattern to be produced, means for severing such lengths from said ribbons to form the tesseræ, and means for pressing the tesseræ upon said foundation; substantially as set forth.

14. In a machine for use in making floor-cloth, means for supporting a series of the composition ribbons, combined with the series of bars 81 having the feet 80 for feeding predetermined lengths of said ribbons to and upon a foundation, means for actuating said bars 81 to cause said feet to effect such feeding, a perforated pattern device 82 for determining the pattern to be formed upon said foundation, means intermediate said pattern device and said bars 81, for determining by means of said pattern device when said bars 81 shall act to feed said ribbons, means for severing such lengths from said ribbons to form the tesseræ, and means for pressing the tesseræ upon said foundation; substantially as set forth.

15. In a machine for use in making floor-cloth, means for supporting a series of the composition ribbons, combined with the series of pivotally-mounted and vertically-slidable bars 81 having the feet 80 for engaging and feeding predetermined lengths of said ribbons to and upon a foundation, the bar 103 engaging said bars 81 and adapted by its motion to impart the proper feeding action to said bars 81, the pivoted arms 90 carried by said bars 81 and adapted to lock said bars 81 to said bar 103, the perforated pattern-roller 82, the series of levers 83 having ends adapted to enter the apertures of said roller 82 and being in coöperative engagement with said arms 90 for unlocking said arms 90 from said bar 103, when it is desired that said bars 81 shall not act to feed said ribbons, means for severing such lengths from said ribbons to form the tesseræ, and means for pressing the same upon said foundation; substantially as set forth.

16. In a machine for use in making floor-cloth, means for supporting a series of the composition ribbons, combined with the series of feet for feeding predetermined lengths of said ribbons to and upon a foundation, means for actuating said feet, a perforated pattern device 82 for determining the pattern to be formed upon said foundation, means intermediate said pattern device 82 and said feet for controlling by means of the said pattern device when said feet shall act to feed the linoleum ribbons, means for severing such lengths from said ribbons to form the tesseræ, and means for pressing the same upon said foundation; substantially as set forth.

17. In a machine for use in making floor-cloth, means for supporting a series of the composition ribbons, combined with the series of bars 81 having the feet 80 for feeding predetermined lengths of said ribbons to and upon a foundation, the pivotally-mounted bar 100 upon which said bars 81 are mounted and upon which they are adapted to have vertical and pivotal movement, the bar 103 upon which said bars 81 are also mounted, means for imparting vertical and oscillatory motion to said bar 103 for actuating said bars 81, springs 102 suspending said bars 81, springs 92 secured to said bars 81, the arms 90 pivotally secured to said bars 81 and having their lower ends 91 normally locking said bars 81 to said bar 103, the perforated pattern-roller 82, means for imparting an intermittent rotary motion to said pattern-roller, the pivotally-mounted levers 83 having portions adapted to contact with said arms 90 and also having pointed ends to enter at the proper time the perforations in said roller 82, the springs 93 normally operating to relieve the levers 83 from the roller 82 and to press the lower portions of said levers 83 against the upper portion of said arms 90 in contact with said springs 92, means for severing such lengths from said ribbons to form the tesseræ, and means for pressing the same upon said foundation, the said perforated roller 82 with the devices coöperating therewith, determining the pattern which shall be formed upon said foundation; substantially as set forth.

18. In a machine for use in making floor-cloth, the series of spools supporting the composition ribbons, the feed-plate over which said ribbons are led, a casing inclosing said spools and feed-plate, and means for maintaining the chamber within said casing at a low temperature, combined with means for feeding predetermined lengths of said ribbons to and upon a foundation, means for severing such lengths from said ribbons to form the tesseræ, and means for pressing the same upon said foundation; substantially as set forth.

19. In a machine for use in making floor-cloth, means for supporting a series of the composition ribbons, a feed-plate over which said ribbons are fed to a foundation, and the superposed frame above said feed-plate and comprising the longitudinal strips carrying partitions for separating said ribbons, combined with means for feeding predetermined lengths of said ribbons to and upon said foundation, means for severing such lengths from said ribbons to form the tesseræ, and means for pressing the same upon said foundation; substantially as set forth.

20. In a machine for use in making floor-cloth, means for supporting a series of the composition ribbons, a feed-plate over which said ribbons are led, and means for chilling said feed-plate, combined with means for feeding predetermined lengths of said ribbons to and upon a foundation, means for severing such lengths from said ribbons to form the tesseræ, and means for pressing the same upon said foundation; substantially as set forth.

Signed at New York, in the county of New York and State of New York, this 22d day of October, A. D. 1901.

DAVID NEILSON MELVIN.

Witnesses:
    CHAS. C. GILL,
    GUNDER GUNDERSON.